United States Patent
O'Malley et al.

(10) Patent No.: US 9,589,124 B2
(45) Date of Patent: Mar. 7, 2017

(54) STEGANOGRAPHIC ACCESS CONTROLS

(71) Applicant: COMCAST CABLE COMMUNICATIONS, LLC, Philadelphia, PA (US)

(72) Inventors: Shawn O'Malley, Glenside, PA (US); Mike Rosenwald, Pottstown, PA (US); Brad Hein, King of Prussia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 14/290,318

(22) Filed: May 29, 2014

(65) Prior Publication Data

US 2015/0347740 A1 Dec. 3, 2015

(51) Int. Cl.
*G06F 21/31* (2013.01)
*G06F 21/36* (2013.01)
*G06T 1/00* (2006.01)
*H04L 29/06* (2006.01)

(52) U.S. Cl.
CPC ............ *G06F 21/36* (2013.01); *G06T 1/0021* (2013.01); *H04L 63/10* (2013.01); *G06T 2201/005* (2013.01); *G06T 2201/0061* (2013.01)

(58) Field of Classification Search
CPC ............................................ G06F 21/31–21/36
USPC ................................ 726/2, 4, 6, 7, 16, 17–21
See application file for complete search history.

(56) References Cited

U.S. PATENT DOCUMENTS 6,572,025 B1 * 6/2003 Nishikado ............ G06K 1/123
  235/462.09
6,970,183 B1   11/2005 Monroe
7,111,168 B2   9/2006 Lofgren et al.
8,121,342 B2   2/2012 Davis et al.
8,250,660 B2   8/2012 Levy et al.
8,330,790 B2   12/2012 Wright et al.
(Continued)

FOREIGN PATENT DOCUMENTS

CA    2218957 A1   11/1996
CN    1433559 A     7/2003
(Continued)

OTHER PUBLICATIONS

"Visitor Management: Protecting your Community from Unauthorized Access", retrieved from http://liftmaster.dwellinglive.com/brochure.pdf on May 22, 2014, 12 pages.
(Continued)

*Primary Examiner* — Alexander Lagor
(74) *Attorney, Agent, or Firm* — Banner & Witcoff, Ltd.

(57) ABSTRACT

Various features described herein may allow an authorized user to provide a guest with access to a secured location through use of an encoded image containing steganographically encoded access information. The encoded access information may be recognizable by a security system, and the security system may grant access to the secured location when the encoded image is presented to the security system. The authorized user may request the generation of the encoded image on an authorized computing device, and the encoded image may be provided to the guest on a guest computing device. When a monitoring device associated with the security system captures the encoded access information, the security system may, for example, open a door at the secured location.

21 Claims, 7 Drawing Sheets

(56) References Cited

U.S. PATENT DOCUMENTS

| | | | |
|---|---|---|---|
| 8,997,195 B1* | 3/2015 | Fadida et al. | H04L 63/083 705/2 |
| 2003/0225700 A1 | 12/2003 | Lao et al. | |
| 2004/0255131 A1 | 12/2004 | Guthery | |
| 2007/0176739 A1 | 8/2007 | Raheman | |
| 2010/0036772 A1* | 2/2010 | Arceneaux | G06Q 20/045 705/50 |
| 2015/0221152 A1* | 8/2015 | Andersen | G07C 9/00309 340/5.22 |

FOREIGN PATENT DOCUMENTS

| | | |
|---|---|---|
| CN | 1139067 C | 2/2004 |
| CN | 1908921 A | 2/2007 |
| CN | 1908922 A | 2/2007 |
| CN | 100470653 C | 3/2009 |
| CN | 100501713 C | 6/2009 |
| DE | 69925466 T2 | 2/2006 |
| EP | 1054335 A2 | 11/2000 |
| EP | 1236183 A2 | 9/2002 |
| EP | 1249002 A1 | 10/2002 |
| EP | 1923830 A2 | 5/2008 |
| WO | 0070585 A1 | 11/2000 |
| WO | 0143067 A2 | 6/2001 |
| WO | 0152178 A1 | 7/2001 |
| WO | 2012048347 A1 | 4/2012 |

OTHER PUBLICATIONS

Ron Amadeo, "Google buys SlickLogin, a startup out to kill the password with sound," Ars Technica, dated Feb. 17, 2014, 3 pages.
"Keyless Entry Goes Home," Techdirt, retrieved Feb. 3, 2014, 4 pages.

* cited by examiner

Fig. 1 – Prior Art

STEGANOGRAPHIC ACCESS CONTROLS

BACKGROUND

Modern homes may employ security systems to secure the premises by detecting and deterring unauthorized access to the home. However, these homes continue to use physical keyed locks to control access into the home. If a homeowner wishes to allow a guest access to the home while the homeowner is away, the homeowner may hide a key near the home and tell the guest where it is located. This suffers from numerous downsides, such as the risk that thieves or other unauthorized people may locate the hidden key and enter the home. A further downside is that the guest's access cannot be removed without relocating the key, and the guest may take the key and retain access to the home until the locks are changed at great cost to the homeowner. These and other shortcomings are addressed by the present disclosure.

SUMMARY

The following summary is for illustrative purposes only, and is not intended to limit or constrain the detailed description.

Some of the features described herein may allow an authorized user to provide a guest with access to a secured location through use of an encoded image containing steganographically encoded access information. The encoded access information may be recognizable by a security system, and the security system may grant access to the secured location when the encoded image is presented to the security system. The authorized user may request the generation of the encoded image on an authorized computing device, and the encoded image may be provided to the guest on a guest computing device. When a monitoring device associated with the security system captures the encoded access information, the security system may grant access to the secure location by, for example, opening a door at the secured location.

Steganographic techniques generally involve encoding information within a message, file, or image. The encoded information may be included in "plain sight," but encoded in such a way that an observer would be unlikely to notice the encoded information. For example, information can be steganographically encoded in an image by adjusting pixels of the image to include the information. If a receiver is aware of how the information was encoded in the image, the receiver may be able to extract the encoded information.

In some embodiments, a method is provided where a base image is received from a first user. A first portion of the base image may be encoded with access information, thereby generating an encoded image. The access information may be steganographically encoded in the encoded image. The encoded image may be transmitted to a second user. A monitoring device at a secured location may capture a display of the encoded image in a captured image. Access information in the captured image may be recognized and the method may grant access to the secured location based on the access information.

In some embodiments, one or more access restrictions for the second user may be received, for example, from the first user. The one or more access restrictions may be steganographically encoded in one or more second portions of the encoded image. In some embodiments, the second portions may be different from the first portion. The access restrictions may be recognized in the captured image and access to the secure location may be granted based on the access restrictions.

In some embodiments, a security database associated with the secured location may store the access information, and the access information may be associated with one or more access restrictions including time of day restrictions, weekday restrictions, number of uses permitted, and/or authentication levels. The security database may further store the base image and/or the encoded image.

Embodiments may further involve receiving an identifier of the second device and access to the secure location may be granted based on the identifier. For example, access by a specific encoded image may be limited to a specified device identifier and granting access to the secured location may be based on the identifier of the second device matching the specified device identifier. A security system associated with the secured location may be notified of one or more access restrictions, and the monitoring device may be activated based on the access restrictions.

In some embodiments, a first device of the first user may be configured to capture the base image using a camera responsive to a request by the first user to create the encoded image. Various criteria may be used to determine whether the base image is suitable for steganographically encoding access information as described herein, and the first user may be prompted to capture another base image if an initial base image does not satisfy the criteria.

In some embodiments, an access notification may be generated in response to recognizing the access information, and the access notification may be provided to the first user or any other authorized user. The access notification may include the captured image, the encoded image, and/or the base image. The method may further capture an identifying image or identifying biometric information of the second user, such as a fingerprint. The identifying information may be used to generate an access record that may be stored in a security database or provided to the first user.

In some embodiments, the receiving, encoding, and recognizing steps are performed by a security backend located remotely from the secured location. In some embodiments, the encoded image may be transmitted to the second user by a mobile messaging service, email, and/or an application associated with a security system controlling access to the secured location.

In still further embodiments, a system is provided comprising a security backend and a local security system. The security backend may receive a base image from a first user and steganographically encode a first portion of the base image with access information to create an encoded image. The security backend may store the access information in a security database and transmit the encoded image to the first user or a second user. The local security system may comprise a monitoring device and capture a display of the encoded image in a captured image by the monitoring device at a secured location. The local security system may recognize the access information in the captured image and grant access to the secured location based on the access information.

In some embodiments, the local security system may be configured to recognize the access information by transmitting at least a portion of the captured image to the security backend and receiving an indication from the security backend that the captured image includes the access information.

In some embodiments, the system may further comprise a first device associated with the first user and configured to capture the base image in response to a request by the first user to generate the encoded image. The first device may provide the base image to the security backend.

In still further embodiments, a system is provided comprising a first device associated with a first user and a second device associated with a second user. The first device may capture a base image in response to a request by the first user to generate an encoded image and steganographically encode a first portion of the base image with access information to create the encoded image. The first device may further transmit an indication of the access information to a security system associated with a secured location and transmit the encoded image to a second user. The second device may receive the encoded image from the first user and display the encoded image for capture by a monitoring device at the secured location. The security system may grant access to the secured location in response to the monitoring device capturing the presented encoded image.

In some embodiments, the first device may receive a selection of one or more access restrictions from the first user and encode the one or more access restrictions into one or more second portions of the base image, wherein the access restrictions are steganographically encoded in the encoded image and the security system grants access to the secured location based on the access restrictions.

In still further embodiments, a method is provided where a base media file is received from a first user, wherein a first device of the first user is configured to capture the base media file using an input device responsive to a request by the first user to create an encoded media file. A first portion of the base media file may be steganographically encoded with access information to create an encoded media file. The encoded media file may be transmitted to a second user. A security system associated with a secured location may be notified of one or more access restrictions. A monitoring device at the secured location may be activated based on the access restrictions. A presentation of the encoded media file may be captured by the monitoring device. The monitoring device may recognize the access information in the captured media file and grant access to the secured location based on the access information.

Embodiments may further comprise receiving a selection from the first user of one or more access restrictions associated with the second user. The access restrictions may be steganographically encoded in one or more second portions of the encoded media file. The monitoring device may recognize the access restrictions in the captured media file and granting access to the secured location may be based on the access restrictions.

In still further embodiments, a method is provided where a first portion of a received base image is steganographically encoded with access information and one or more second portions of the received base image are encoded with one or more access restrictions, thereby creating an encoded image. A monitoring device at a secured location may capture a display of the encoded image in a captured image, and access to the secured location may be granted when the access restrictions are met based on recognizing the access information and the access restrictions in the captured image. The base image may be captured by a camera in response to a request to create the encoded image. An identifier of a device associated with the display of the encoded image may be received and granting access to the secured location may be based on the identifier.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

Figure 1:
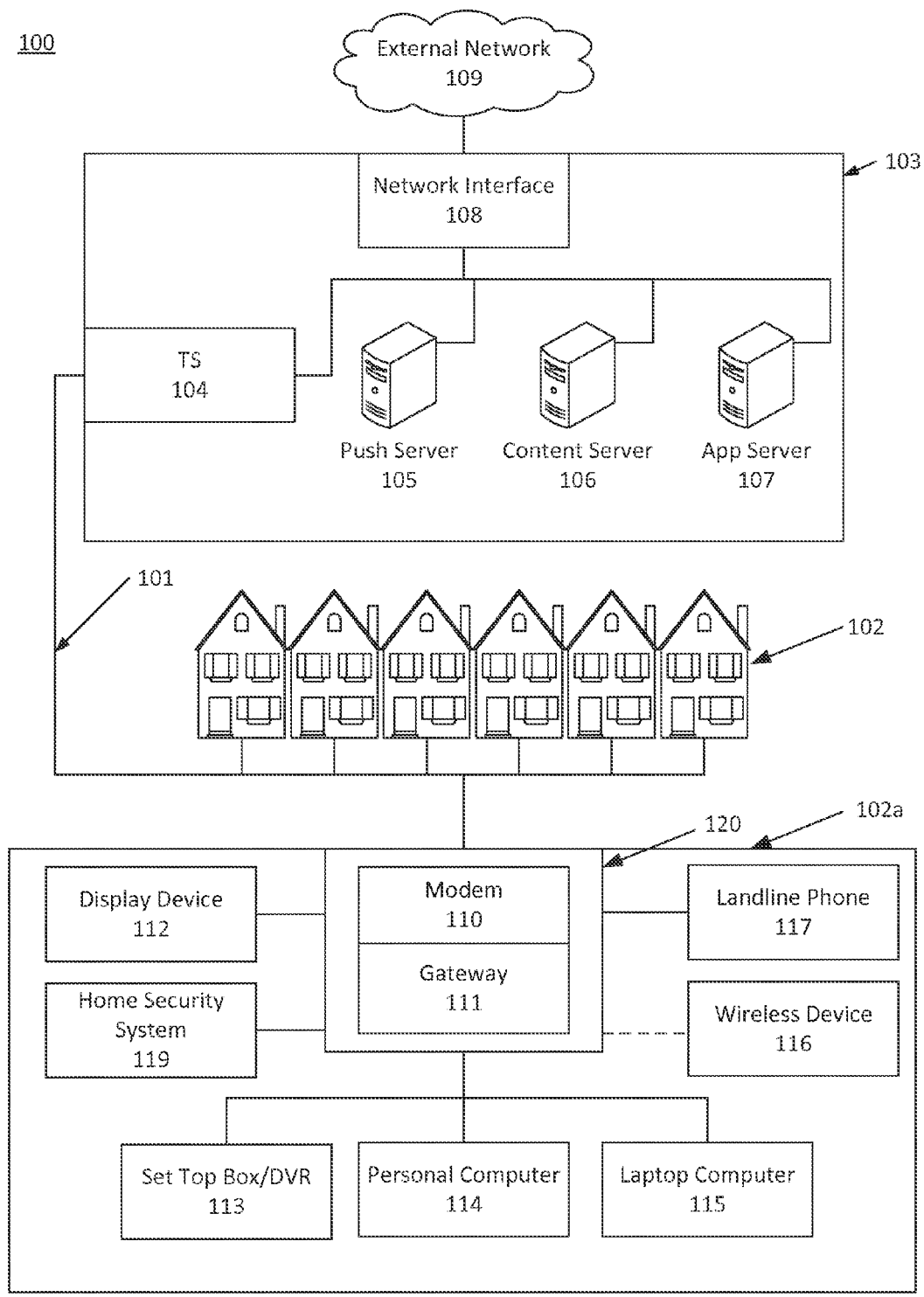
FIG. 1 illustrates an example communication network on which various features described herein may be implemented.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features described herein may allow an authorized user to provide a guest with access to a secured location through use of an encoded image containing steganographically encoded access information. The encoded access information may be recognizable by a security system, and the security system may grant access to the secured location when the encoded image is presented to the security system. The authorized user may request the generation of the encoded image on an authorized computing device, and the encoded image may be provided to the guest on a guest computing device. When a monitoring device associated with the security system captures the encoded access information, the security system may, for example, open and/or unlock a door at the secured location.

An illustrative example of a specific application of the techniques disclosed herein may be a homeowner who wants to provide a housekeeper with access to the homeowner's house while the homeowner is away on vacation. This example is not intended to limit the disclosed techniques described herein. Rather, this example helps illustrate various aspects as will be described below. The homeowner may request the generation of an encoded image which will allow the housekeeper to access the house. In some embodiments, the homeowner may use, for example, a smartphone application associated with a security system protecting the house. The homeowner may request the generation of an encoded image for the housekeeper. The application may prompt the homeowner to use the smartphone's camera to take a picture that will be used to generate the encoded image. For example, the homeowner may take a picture of a nearby tree at his vacation destination. The application may further allow the homeowner to select access restrictions for the housekeeper. For example, the homeowner may select that the encoded image should only provide access between 10 AM and 2 PM on weekdays.

The base image and any access restrictions may be provided to a security backend associated with the home security system. The security backend may steganographically encode access information and/or the access restrictions in the base image, thereby generating an encoded image. Steganographic techniques may encode information in an image without changing the image in a readily noticeable fashion. For example, a series of pixels in the image may have their colors changed by a small amount, such as by changing the least significant bits of the image data. Such a change may be difficult or impossible for a human to notice, but may be readily discerned by a computing device programmed to do so. In some embodiments, the homeowner's smartphone may itself encode the access information instead of sending the base image to the security backend.

The security backend and/or the homeowner's smartphone may send the encoded image to the housekeeper's device. The housekeeper may have a mobile phone with a limited feature set, but capable of displaying images. The encoded image may be sent to the housekeeper using a mobile messaging protocol, such as via an SMS text message. The housekeeper can then go to the house and use the mobile phone to present the encoded image to a monitoring device, such as a security camera, associated with the security system protecting the house. The monitoring device may capture the display of the encoded image, and the home security system may recognize the access information encoded in the encoded image. In some embodiments, the home security system may send captured images to the security backend for further processing and recognition of the access information. If the access information is recognized in the encoded image, and any access restrictions are satisfied, the housekeeper may be granted access to the house. For example, upon recognizing the encoded image, the security system may electronically unlock a door located nearby the monitoring device that captured the encoded image. After the housekeeper has cleaned the house, the homeowner can use the application to revoke the access associated with the encoded image.

Figure 2:
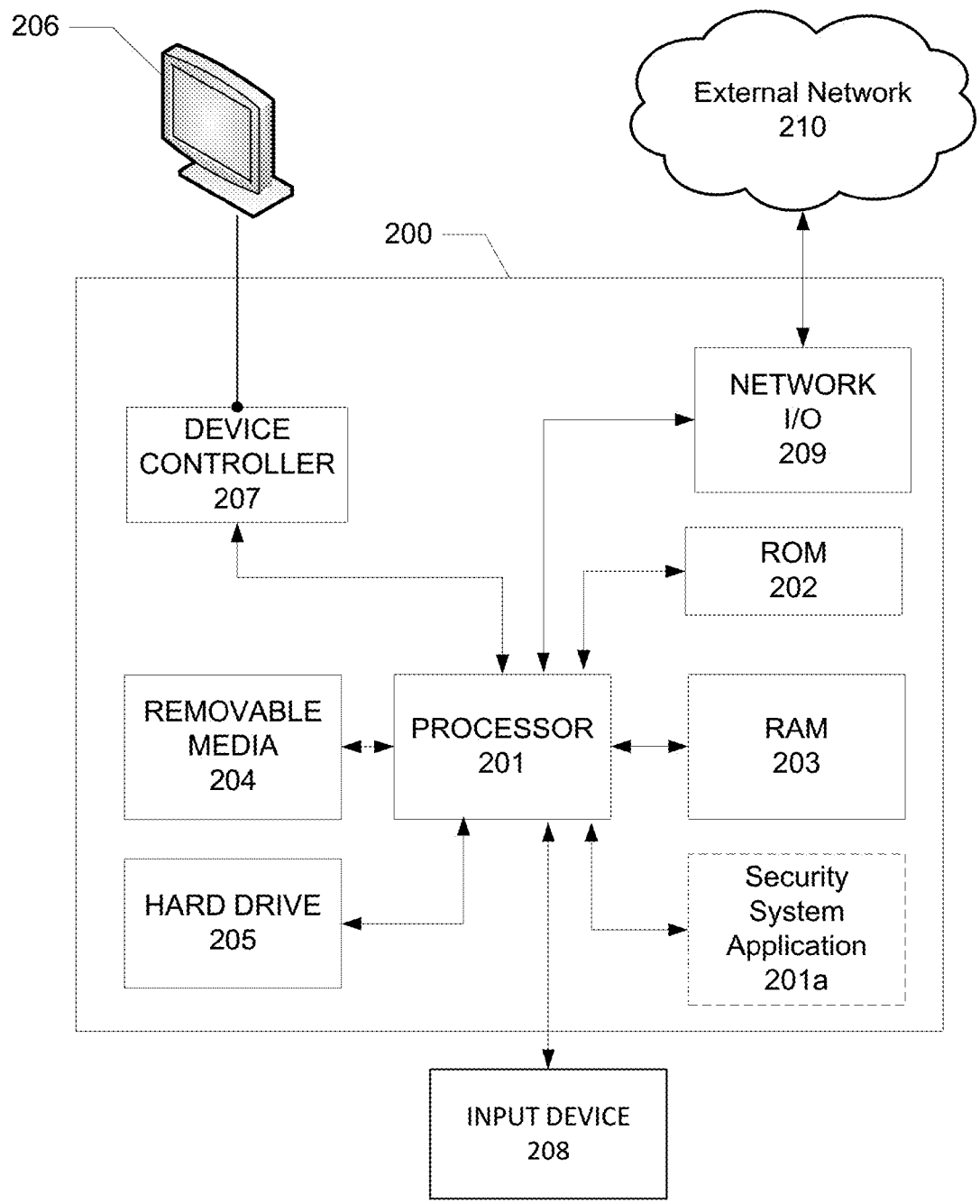
FIG. 2 illustrates an example computing device that can be used to implement any of the features described herein.
Figure 3:
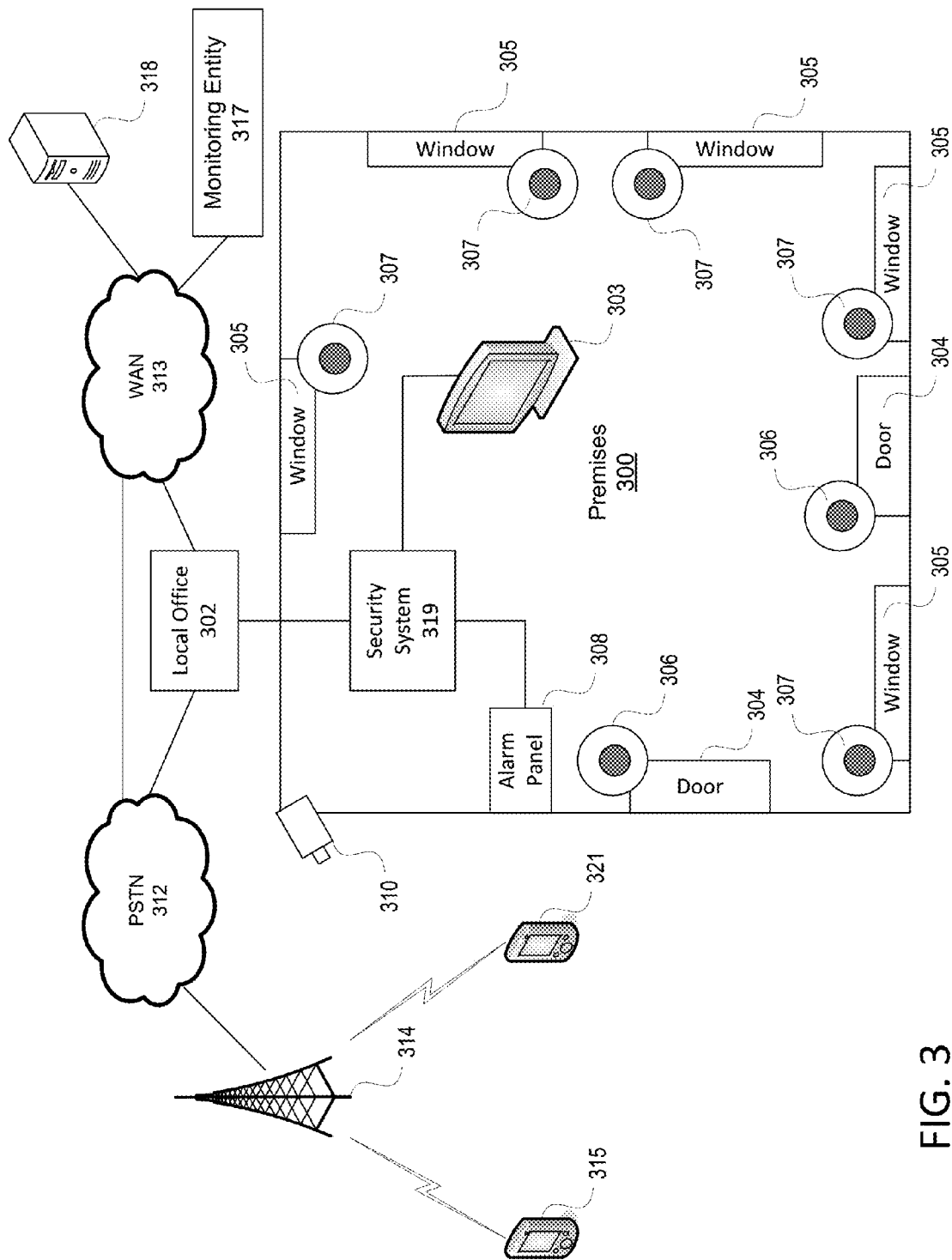
FIG. 3 illustrates an example operating environment in which one or more of the various features described herein may be implemented.

Various features of methods and systems for providing access to a secured location using steganographically encoded images will be described in greater detail below. However, first an exemplary operating environment as shown in FIGS. 1, 2, and 3 will be described.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Each of the described functions may be provided by one or more application servers, and a single application server may provide more than one of the described functions. For example, a single physical server may implement one or more application servers responsible for each of the described functions. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102*a*, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a interface device 111, such as a gateway. The modem 110 may be connected to, or be a part of, the interface device 111. The interface device 111 may be one or more computing devices that communicate with the modem (s) 110 to allow one or more other devices in the premises 102*a*, to communicate with the local office 103 and other devices beyond the local office 103. The interface device 111 may be a set-top box (STB), digital video recorder (DVR), computer server, or any other desired computing device. The interface device 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images and/or video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include security system application data 201*a* which may enable the device to perform the steps described herein.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Having discussed an example network environment and computing device, discussion will now turn to FIG. 3, which illustrates an example operating environment in which various features described herein may be performed and implemented.

As illustrated in FIG. 3, the environment may include a premises 300 (which may correspond to the premises 102 of FIG. 1), such as a user residence, business, recreational facility, etc. (referred to herein as a user residence, home, or premises in a non-limiting manner), and a local office 302 (which may correspond to the local office 103 of FIG. 1). The premises 300 may include one or more doors 304 and one or more windows 305. The doors 304 may be secured by an associated door security control 306, such as an electronically controlled locking mechanism, a proximity sensor, contact switch, motion detector, a combination thereof, and the like. In addition, each of the plurality of windows 305 may be secured by associated window security controls 307, which may be similar to the door security control 306. The security controls 306 and 307 may be communicatively coupled to a security system 319 (which may correspond to the home security system 119 of FIG. 1), which may allow the security controls 306 and 307 to be engaged, disengaged, armed, disarmed, and monitored. In one arrangement, an alarm panel 308 may be implemented in and/or as part of security system 319. Through the door security controls 306, security system 319 may electronically control access to the premises 300.

Many other security sensors and devices may be communicatively coupled to the alarm panel 308 and/or security system 319. For example, security system 319 may be communicatively coupled to one or more cameras 310, which may capture images and record video to monitor the premises 300 and surrounding area. One or more cameras 310 may be located so as to monitor an access location of the premises 300, such as a door 304. According to various techniques disclosed herein, images captured by a camera 310 associated with a door 304 may be used by the security system 319 to grant access to an access location such as a door 304.

From the example diagram of FIG. 3, various features may be realized. For example, the security controls 306 and 307, cameras 310, alarm panel 308, and security system 319 may be communicatively coupled to a user interface device, such as the television 303 (or another type of display). Additionally and/or alternatively, the security controls 306 and 307, cameras 310, alarm panel 308, and security system 319 may be in communication with one or more authorized devices 315 (e.g., a smartphone, tablet, and the like). Through the user interface device (e.g., the television 303 or authorized device 315) an authorized user may configure any of the devices within the security system. Another example feature may include transmitting (e.g., streaming) data (e.g., pictures, video, audio, etc.) from one or more cameras 310 to any of the other devices in the diagram of FIG. 3.

FIG. 3 also shows that the security system 319 may communicate with an external network, such as the local office 302. This communication may be through a gateway such as the interface device 111 of FIG. 1. When an alarm or access event is detected, the local office 302 may record the event (e.g., store information identifying the sensor(s) that were tripped, their location, recording video and/or audio showing the event that occurred, etc.), determine an appropriate reaction, and/or transmit an event signal to an external network, such as the public switched telephone network (PSTN) 312 or a wide area network (WAN) 313. In some embodiments, a remote security server 318 may be accessed over the WAN 313 and may process and handle events and data generated by security system 319. Although FIG. 3 illustrates a WAN 313, any suitable network for communication between the local office 302, security system 319, and/or remote security server 318 may be used, such as a local area network (LAN). In some embodiments, one or more features of the remote security server 318 may be implemented by the local office 302. In still other embodiments, the security system 319 may record the event, determine the appropriate reaction, and/or transmit the event signal by communicating directly with the networks 312, 313, and/or 316. Thus, the security system 319 may transfer event signals, notifications, and access requests upstream for processing and handling.

Via the PSTN 312, the local office 302 may transfer an event signal to a cell tower 314 and ultimately to a designated authorized device 315 (e.g., smartphone, tablet, etc.). Similarly, the authorized device 315 may transfer commands and configuration data back to the security system 319. Additionally and/or alternatively, the local office 302 may transfer an event signal via the WAN 313 (e.g., the Internet) to a monitoring entity 317 and/or a remote security server 318. The monitoring entity 317 may be the same entity as the local office 302 or a third party entity. The monitoring entity 317 and/or the remote security server 318 may be responsible for monitoring the premises 300. This may include responding to alert signals and access requests received when the security system 319 detects an event. For example, as will be discussed further below, in one embodiment the security system 319 may capture a display of an encoded image and transfer that image upstream to the local office 302, the monitoring entity 317, and/or the remote security server 318 for processing and recognition. After upstream processing, the security system may grant access if appropriate access information is recognized in the encoded image.

The remote security server 318 may be a computing device capable of providing a web portal through which users may view, on any connected display device, information regarding the security of the premises 300. Users may log-on to the web portal provided by the remote security server 318 and view an alarm or access event and/or information related to the event, such as when an access event was triggered and any identifying information associated with the access event. For example, the web portal may indicate that a guest requested access at 10:00 AM and may provide a picture of that guest at a door 304. Also through the web portal, a user may be able to view video of the premises 300 captured by the camera 310 or may be able to check the status of the security system. Where the remote security server 318 is coupled to a WAN 313, such as the Internet, the web portal for the premises 300 may be accessed using any device that can connect to the WAN 313, such as a smartphone, tablet, laptop, etc. The web portal may also be used to customize settings, such as schedules, to indicate when and how the security system should operate. For instance, using the web portal a user may be able to specify access restrictions whereby the security system 319 may allow guests to access the premises 300 during a specified time of day, provided the guest possesses appropriate access credentials (such as the encoded images discussed further herein). The web portal may also allow a user to view authorized guests and their associated encoded images. The user may be able to revoke the access rights afforded to any of the authorized guests through the web portal. If an access right is revoked, the guest may be denied entry to the premises when they present the encoded image.

As shown in FIG. 3, the authorized device 315 may be in communication with the security system 319 and the local office 302 by way of a PSTN 312. Although illustrated as communicating through a PSTN 312, the authorized device 315 may communicate with the security system 319 and the local office 302 by way of a WAN 313, a LAN, and/or any other suitable communications method. The authorized device 315 can be any suitable computing device, such as a computing device 200 as in FIG. 2, including but not limited to a smartphone, tablet computer, laptop computer, desktop computer, and/or a specialized computing device, and the like. The authorized device 315 may include a camera suitable for capturing images and/or video. The authorized device 315 may be configured to allow a user to control access to the premises 300 in accordance with various techniques described herein. As will be discussed further below, the authorized device 315 may allow the user to generate an encoded image that can be sent to a guest device 321 such that the guest device 321 may be used to access the premises 300. The authorized device 315 may also allow a user to revoke any previously granted access rights for a given guest, thereby rendering access information previously encoded in an image invalid. The guest device 321, similar to the authorized device 315, may be any suitable computing device, including but not limited to a smartphone, tablet computer, laptop computer, desktop computer, and/or a specialized computing device, and the like. As will be discussed further below, the guest device 321 may generate a presentation of an encoded image received from the authorized device 315 and display the encoded image to a camera 310 associated with the security system 319 in order to access the premises 300.

Figure 4:
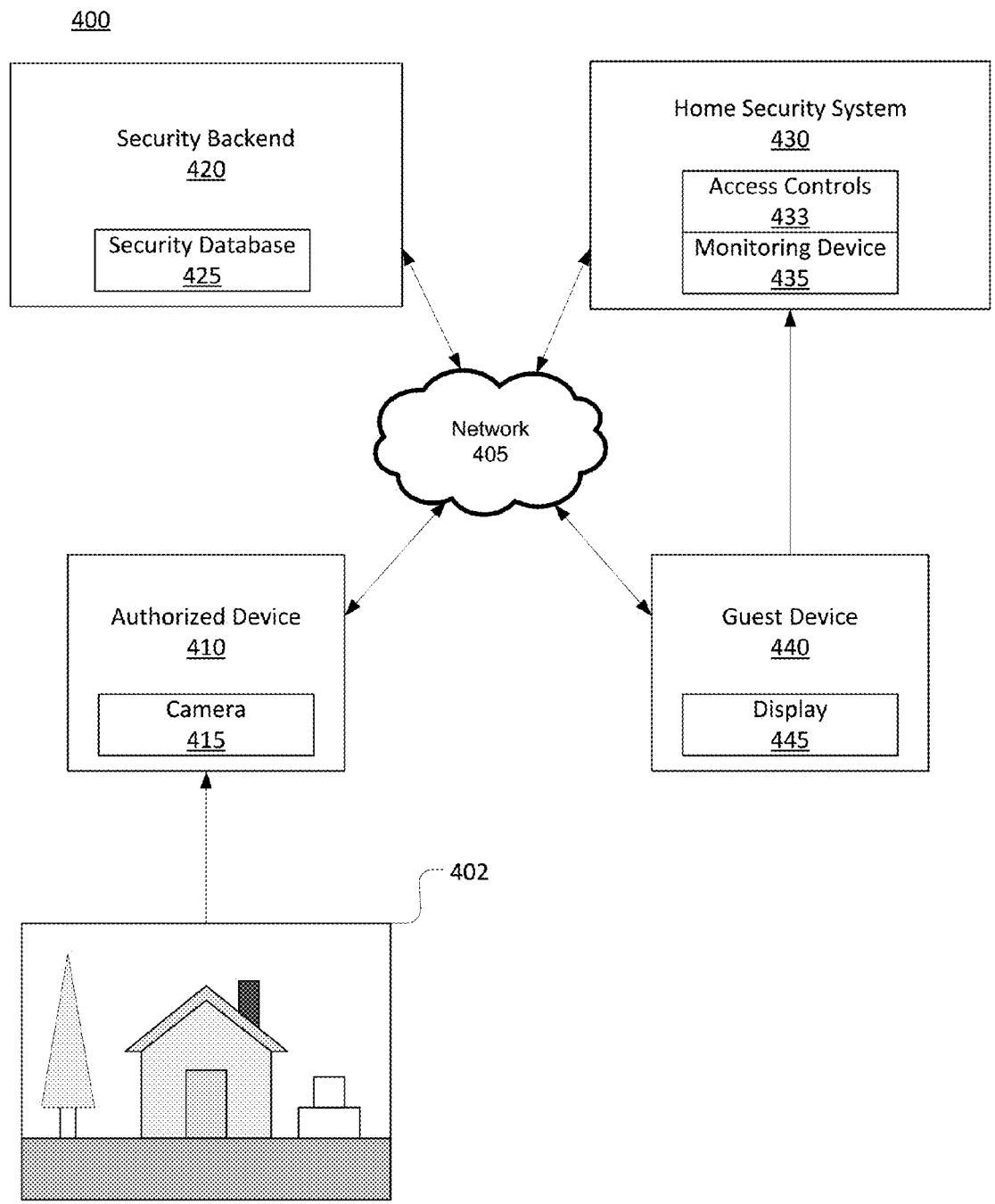
FIG. 4 illustrates an example system for implementing various features described herein.

Having discussed an example network environment, an example computing device, and an example operating environment, discussion will now turn to an illustrative system which may be used to implement some of the various techniques disclosed herein, as shown in FIG. 4.

FIG. 4 illustrates a system 400 including an authorizing device 410, a security backend 420, a home security system 430, and a guest device 440. Each of the devices shown in FIG. 4 may communicate using a network 405. The network 405 may be any suitable network for communication between devices, such as a WAN 313 as shown in FIG. 3 and/or any other type of network described herein. Although FIG. 4 illustrates one network 405, more than one network may be used to facilitate communication between the devices of FIG. 4, and more than one type of network may be used. For example, the authorized device 410 may communicate with the security backend 420 using a PSTN or cellular phone network, and the security backend 420 may communicate with the home security system 430 through a connection such as links 101 (FIG. 1) between a local office such as the local office 302 (FIG. 3) and a gateway such as interface device 111 (FIG. 1).

FIG. 4 illustrates an authorized device 410, which may, for example, correspond to the authorized device 315 illustrated in FIG. 3. The authorized device 410 may be any suitable computing device, such as a computing device 200 as in FIG. 2, including but not limited to a mobile phone, smartphone, tablet computer, laptop computer, desktop computer, and/or a specialized computing device, and the like. The authorized device 410 may include or be associated with a camera 415 suitable for capturing images and/or video. In one embodiment, the camera 415 may be integrated in and/or a part of the authorized device 410. As one example, the authorized device 410 may be a smartphone belonging to an owner of a house, which may correspond to the premises 300 (FIG. 3). However, as noted above, the techniques described herein are not limited to securing a house and may be used for any premises for which access control is desirable, such as a commercial office, an event venue, a vehicle, and the like.

The authorized device 410 may include a security application that allows a user, such as the owner of the house, to generate an encoded image for providing access to a secured location, such as the house. The process by which the encoded image may be generated is discussed further below in regard to FIGS. 5-7. In generating the encoded image, the authorized device 410 may use the camera 415 to capture a base image, such as a scene 402. The scene 402 may include any location, object, person, activity, event, and/or other visual setting. The scene 402 may be any image captured by the camera 415. The authorized device 410 may prompt the user to use the camera 415 to capture a base image in response to a request by the user to generate an encoded image. In some embodiments, the user may be prompted to capture a scene 402 that may be readily associated with the premises 300, for example where the scene 402 includes in it an image of the premises 300 or of the owner. In other embodiments, the authorized device 410 may allow a user to select from a group of images stored on the authorized device 410 or elsewhere. In such a case, the security application may use various criteria to determine whether a picture may be selected as the base image, such as the time the picture was taken, an amount of entropy and/or randomness in the picture, content of the picture, location the picture was taken, device that captured the picture, previous usage of the picture, and/or other criteria determining the suitableness of the picture for use with steganographic encoding techniques. Similarly, these criteria may be used to verify that a base image captured by the user is suitable for use as an encoded image. If a base image does not meet these criteria, the authorized device 410 may inform the user and request a selection/capture of another suitable image. In some embodiments, the authorized device 410 may encode access information and access restrictions into the base image. In other embodiments, the authorized device 410 may transmit the base image to the security backend 420 or home security system 430 for encoding.

FIG. 4 also illustrates a security backend 420, which may, for example, correspond to the local office 302, remote security server 318, and/or monitoring entity 317 of FIG. 3. The security backend 420 may be operable to remotely manage the home security system 430, which may correspond to the security system 319 (FIG. 3). In other embodiments, the security backend 420 may be located on the premises 300, and the security backend 420 may be integrated with or communicatively coupled with the home security system 430. The security backend 420 may be a backend system for providing security services to the premises. The security backend 420 may be remote from the premises, such as where the security backend 420 is located at a local office 302. The security backend 420 may be a server computing device or other suitable computing device for providing security services. In some embodiments, the security backend 420 may provide security services to multiple premises and home security systems. The security backend 420 may manage the home security system 430 by receiving information and events from the home security system 430, determining an appropriate course of action, and transmitting instructions to the home security system 430. The security backend 420 may also provide configuration information and parameters to the home security system 430. For example, the security backend 420 may provide the home security system 430 with parameters indicating times during which the home security system 430 should monitor the premises 300 for a presentation of an encoded image in accordance with various techniques disclosed herein.

The security backend 420 may receive a base image from an authorized device 410 as part of a request to generate the encoded image. It may also receive one or more access restrictions associated with the request. The security backend 420 may encode access information and the one or more access restrictions into the base image to generate the encoded image. The access information may be information recognizable by the security backend 420 and/or home security system 430 as identifying a guest who may be permitted to enter the premises. A guest presenting the access information may be allowed entrance into the premises, much like a bearer of a physical key can enter a door protected by a keyed lock. For example, the access information may be a computer-recognizable key value associated with the premises 300 (FIG. 3). As another example, the access information may be a shape or pattern that may be embedded in the base image. The access information may be predetermined and/or may be dynamically determined by the security backend 420, authorized device 410, and/or home security system 430. The access information may be determined based on attributes associated with the premises, the home security system, the authorizing device, a user of the authorizing device, the guest device, a user of the guest device, a time of day, a date, the security backend, the home security system, and/or any suitable basis for generating and recognizing access information. The access restrictions associated with the access information may include any restrictions on when and/or how the access information may be used to access the secured location. Access restrictions may include a valid time of day, valid days of the week, valid dates, limited number of uses, expiration date, user identity, verification procedures, notification procedures, device restrictions, and/or any suitable restriction on when and/or how the secured location may be accessed.

Once determined and used to generate an encoded image, the access information may provide a guest with access to the premises when presented to the home security system 430. In some embodiments, a user of the authorizing device 410 may later decide to revoke the access rights associated with the access information. In other embodiments, the access rights associated with the access information may be revoked for other reasons, such as an expiration date, unauthorized access attempts, and/or any other suitable reason for not granting access to a bearer of the encoded access information. After the access rights have been revoked, the home security system 430 may no longer grant the guest access based on that access information.

The security backend 420 may provide a steganographic module that may use steganographic techniques to encode the access information and/or access restrictions into one or more portions of the base image, thereby generating an encoded image. For example, in some embodiments the base image may be broken into four quadrants. In one illustrative embodiment, the access information may be encoded in a first quadrant, an access restriction relating the permissible access times may be encoded in a second quadrant, an access restriction relating to the number of times the encoded image can be used may be encoded in a third quadrant, and an identifier associated with an intended guest may be encoded in a fourth quadrant. Additionally and/or alternatively, information may be redundantly encoded throughout portions of the base image. For example, each quadrant of the image may be encoded with the access information and access restrictions. Such redundant encoding may facilitate better recognition of the encoded image by the home security system 430 or the security backend 420.

A wide range of steganographic methods may be used by the security backend 420, or an authorized device 410, to encode information in the base image. The access information and one or more access restrictions may be encoded in the base image by changing one or more attributes or data values of the base image. For example, in one embodiment a least significant bit of a range of pixel data may be changed to encode the access information. In other embodiments, higher order bits may be used. In still other embodiments, a pattern or other sequence of bits and/or pixels may be used to encode the access information in the base image. For example, a particular set of pixels in the image may be used to encode the information and the particular locations used may be known to both the encoding party and the decoding party. Other steganographic methods used to encode the access information and access restrictions in the base image may include adjusting colors, brightness, contrast, embossing, patterns, shapes, and/or any other attributes or data of the base image. Additionally and/or alternatively, a key or algorithmic hint may be encoded in the encoded image such that a decoding device may use the key or algorithmic hint to recognize the encoded access information and/or access restrictions. In some embodiments, the steganographically encoded information may be decoded and/or extracted by comparing the encoded image to the base image. In other embodiments, the steganographically encoded information may be decoded and/or extracted based on a pre-determined and/or pre-shared algorithm. A human viewer may not be able to recognize a difference between the base image and the encoded image, but such a difference may be easily recognized by a computer programmed to look for such differences.

The security backend 420 may include or be associated with a security database 425. The security database 425 may store information related to the operation of the home security system 430 and the premises 300. For example, the security database 425 may store alarm and access events generated by the home security system 430. The security database 425 may further store information related to a request to generate an encoded image, such as the access information, associated access restrictions, the base image, and/or the encoded image. When an access event is received, the security backend 420 may compare encoded information extracted from the access event to data stored in the security database 425 to determine if access should be granted. For example, the security backend 420 may receive an image taken by a video camera at a door located on the premises 300 and recognize within the image a display of an encoded image containing candidate access information. The security backend 420 may compare this candidate access information to the access information and associated restrictions stored in the security database 425 to determine whether the door should be unlocked. The security backend 420 may remove access information from the security database 425 in response to a user request to revoke the access right, or based on a set expiration period and/or criteria.

In accordance with some aspects disclosed herein, the security backend 420 may notify the home security system 430 of access restrictions associated with an encoded image containing access information. For example, the security backend 420 may notify the home security system 430 that the access information is only valid from 10 AM to 2 PM, and the home security system 430 may adjust its operation accordingly, such as by monitoring a video feed for the encoded image during the specified time frame and not during other times.

FIG. 4 also illustrates a home security system 430, which may, for example, correspond to the security system 319 as shown in FIG. 3. The home security system 430 may be located at the secured premises and may monitor the premises, report events, and control access to the premises. Although FIG. 4 illustrates a home security system 430, the nature of the home security system 430 as a "home" security system is merely illustrative. As noted above, the techniques described herein may be applicable to securing any sort of premises or venue for which access control is desirable, such as a commercial office, an event venue, a vehicle, and the like. As discussed above, the home security system 430 may include a variety of sensors and controls, including one or more electronic access controls 433. The electronic access controls 433 may be operable to control access to the premises by locking a door or otherwise barring entry to the premises. The home security system 430 may grant a guest access to the premises by, for example, using the electronic access controls 433 to unlock a door at which the guest presents acceptable access credentials, such as by presenting an encoded image containing access information as described herein.

The home security system 430 may also include a monitoring device 435, such as a security camera and/or other sensors for monitoring the premises. The monitoring device 435 may be used to capture a presentation by a guest device 440 of the encoded image. Where the monitoring device 435 is a security camera, the security camera may capture a scene including the guest device displaying the encoded images. In other embodiments, the monitoring device 435 may be a more specialized camera or reader designed to capture a display of the encoded image rather than monitor the premises. In some embodiments, the monitoring device 435 may recognize when a candidate encoded image is presented for capture and capture an image, or the monitoring device 435 may periodically or constantly capture an image and determine whether a candidate encoded image is present. In some embodiments, the home security system 430 may forward captured images to the security backend 420 without determining whether a candidate encoded image is present. The home security system 430 may be notified of access restrictions associated with the encoded image and may be configured to activate the monitoring device 435 based on the access restrictions and process images captured by the monitoring device 435. The home security system 430 may also utilize one or more sensors to determine whether to activate the monitoring device 435. For example, a motion sensor could be used to activate the monitoring device 435 when activity is detected. As one example, the home security system 430 may capture images and assume candidate encoded images may be present when a motion sensor captures activity and/or when one or more access restrictions of which it has been notified have been met, such as during a specified time period.

In some embodiments, the home security system 430 may transmit captured images upstream to the security backend 420 for further processing, including recognition of the encoded image. In some embodiments, the home security system 430 may capture a series of images which may be used together to better identify the encoded image. For example, if a guest were holding a guest device 440 up to the monitoring device 435, more than one image may be captured by the monitoring device 435 and used during processing to account for and minimize information lost or distorted in the encoded image as presented to the monitoring device 435. If there were glare or the guest was unable to hold the device still, the series of images may be used to better identify the encoded image in the captured image. The home security system 430 may engage in some preprocessing to determine whether a captured image may contain a candidate encoded image and should be sent upstream. In other embodiments, the home security system 430 may recognize encoded access information without sending the capture upstream. For example, the security backend 420 or the authorizing device 410 may have provided the home security system 430 with an indication of the encoded image or access information, and the home security system 430 may itself watch for and recognize a display of the encoded image.

Upon recognizing the access information encoded in the encoded image, the home security system 430 may grant the user access to the premises by, for example, unlocking a door. The home security system 430 may determine that a captured image includes encoded information, may extract that information, and may determine whether that information matches expected access information or credentials. In other embodiments, one or more of these steps may be handled by the security backend 420. For example, the home security system 430 may determine that a captured image contains candidate encoded information, extract that information, and send the extracted information upstream to the security backend 420 to determine whether the extracted information matches expected access information or credentials. In other embodiments, the home security system 430 may provide a periodic stream of images to the security backend 420, and the security backend 420 may monitor the stream for encoded information. The security backend 420 may notify the home security system 430 whether the encoded information is valid and matches the expected access information, and the home security system 430 may grant the guest access based on the notification.

The monitoring device 435 may be further used to capture identifying information related to a user of a guest device 440 as part of or before allowing the user to access the premises. For example, a security camera could capture a picture of the guest user's face, or a biometric scanner could be used to capture fingerprints, iris or retinal scans, or other identifying biometric data of the guest user. The home security system 430 may prevent access to the premises 300 until satisfactory identifying information is captured. For example, the user may be denied access if the monitoring device cannot get a picture of the user's face or if the user does not provide a complete fingerprint. In some embodiments, biometric or other identifying information associated with the guest user may be preregistered with the home security system 430 and the security backend 420, and access may be conditioned on a match of the captured identifying information with the preregistered information.

As shown in FIG. 4, the guest device 440 may be used by a guest to present a display of the encoded image at the premises 300 in order to gain entry to the premises. Like the authorizing device 410, the guest device 440 may be any suitable computing device, such as a computing device 200 as in FIG. 2, including but not limited to a mobile phone, smartphone, tablet computer, laptop computer, desktop computer, and/or a specialized computing device, and the like. The guest device 440 may receive a transmission of the encoded image. In one embodiment, the encoded image may be sent by the authorizing device 410. In another embodiment, the encoded image may be sent by the security backend 420. The encoded image may be received by the guest device 440 via a number of methods and protocols, such as SMS (Short Message Service) messages, MMS (Multimedia Messaging Service) messaging, other mobile messaging services, email, and the like. In one embodiment, the guest device 440 may execute an application associated with the security backend 420 or the home security system 430 and may request and/or receive the encoded image through the associated application.

After the guest device 440 has received the encoded image, a user of the guest device 440 may take the device to the premises and present a display of the encoded image to a monitoring device 435 of the home security system 430. The guest device 440 may include or be associated with a display 445 for providing a visual presentation of the encoded image. The user of the guest device 440 may request that the guest device 440 display the encoded image, and the user may orient the guest device 440 such that the monitoring device 435 is capable of recognizing access information encoded in the displayed image. For example, the user may hold the guest device 440 up to a security camera so that the security camera can view the display 445. As another example, where the monitoring device 435 is a specialized camera for capturing a display of the encoded image rather than monitoring the premises, a user may place the guest device 440 on a platform or against a panel associated with the monitoring device 435, or otherwise orient the device such that the monitoring device 435 may capture the encoded image presented on the display 445.

Figure 5:
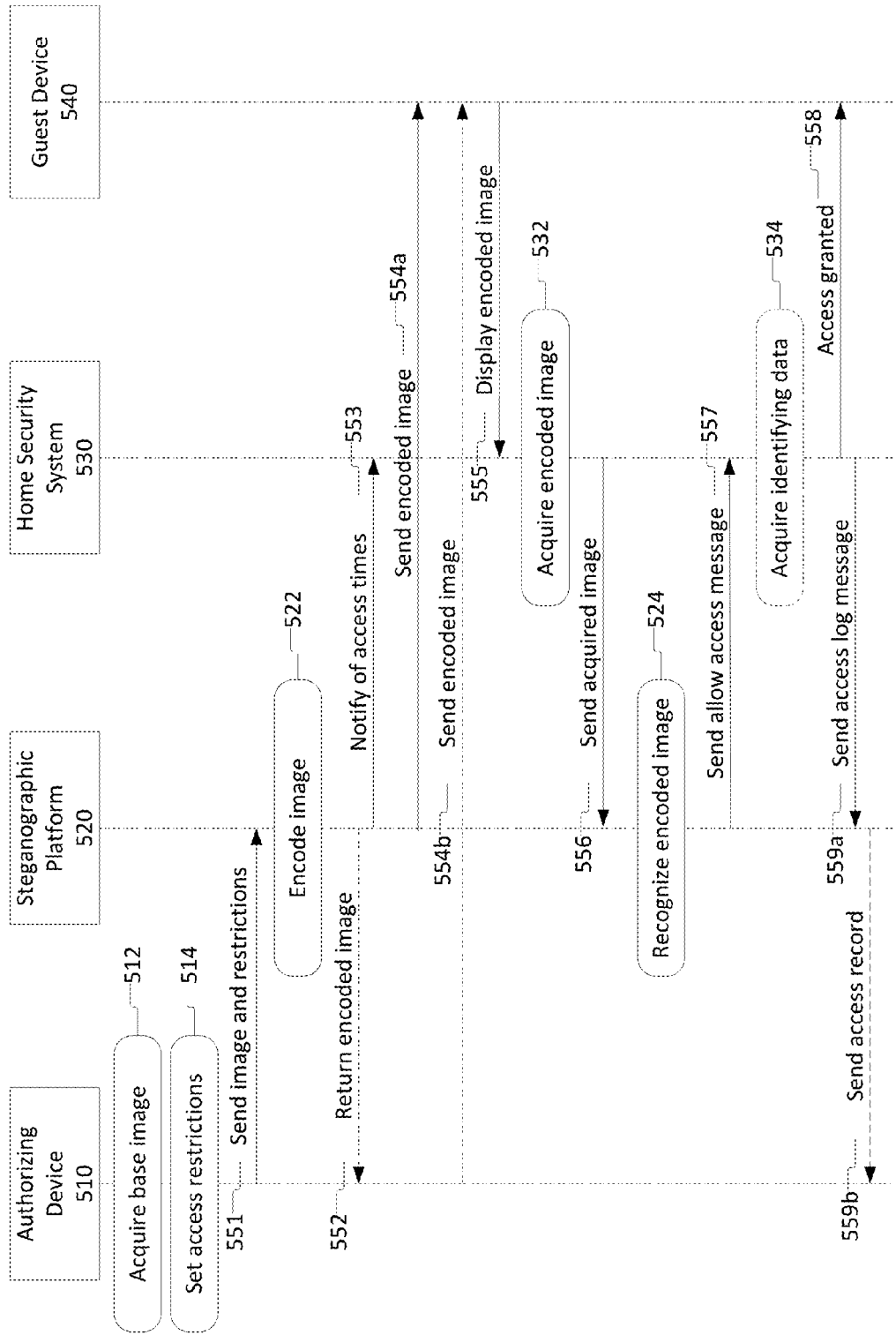
FIG. 5 illustrates an example processing flow for implementing various features described herein.

Having discussed the system of FIG. 4 which may provide a guest with access to a secured premises, a general sequence of a method implementing various techniques described herein as shown in FIG. 5 will be discussed. The process flow illustrated in FIG. 5 may be implemented in the system 400 illustrated in FIG. 4, and/or in other suitable systems.

FIG. 5 illustrates a sequence diagram of one embodiment of the access control techniques described herein. FIG. 5 includes an authorizing device 510, a steganographic platform 520, a home security system 530, and a guest device 540 (which may, for example, respectively correspond to the authorizing device 410, security backend 420, home security system 430, and guest device 440 of FIG. 4). Each of these elements may communicate with each other as indicated by the sequence diagram, such as through a network 405 as illustrated in FIG. 4. As discussed above, in some embodiments, the steganographic platform 520 may be remote from the home security system 530, and in others the steganographic platform 520 may be provided by or integrated within the home security system 530 or the authorizing device 510.

The sequence illustrated in FIG. 5 may begin when a user of an authorizing device 510, such as an owner of a home equipped with a home security system 530, initiates the generation of an encoded image to provide access to a secured location, such as the premises 300 illustrated in FIG. 3. The user may request the generation of the encoded image so that a guest can access the secured location. In one example application of the methods discussed herein, a homeowner may be traveling and may wish to let a housekeeper into the homeowner's house while the homeowner is away. In such an example, the homeowner may use an authorizing device 510, such as a smartphone belonging to the homeowner, to generate an encoded image and provide that encoded image to a guest device 540 associated with the housekeeper, such as a smartphone or mobile phone associated with the housekeeper. This example application represents but one implementation of the methods and techniques described herein, and as discussed above, these techniques may be equally applicable to any premises, event, or resource that a user desires to permit other guests to access. Further, there is no requirement that a user of an authorizing device 510 be an owner of the secured location. Instead, the user of an authorizing device 510 may be any person authorized to grant or control access to the location.

In response to a request to generate the encoded image, an authorizing device 510 may acquire a base image at step 512. In some embodiments, the authorizing device 510 may use an associated or integrated camera to capture the base image. The authorizing device 510 may prompt the user to use the camera to capture an image of a scene for use as the base image. The scene may include any location, object, person, activity, event, and/or other visual setting. In some embodiments, the scene may be readily associated with the secured location, for example where the scene includes in it an image of the secured location or of the homeowner. In other embodiments, the authorizing device 510 may allow a user to select a picture from a group of images stored on the authorizing device 510 or elsewhere. In such a case, a security application provided by the authorizing device 510 may use various criteria to determine whether a picture may be selected as the base image, such as the time the picture was taken, an amount of entropy and/or randomness in the picture, content of the picture, location the picture was taken, device that captured the picture, previous usage of the picture, and/or other criteria determining the suitableness of the picture for use with steganographic encoding techniques. Similarly, these criteria may be used to verify that a base image captured by the user is suitable for use as an encoded image. If a base image does not meet these criteria, the authorizing device 510 may inform the user and request a selection/capture of another suitable image.

At step 514, the authorizing device 510 may allow the user to select one or more access restrictions to associate with the encoded image. The access restrictions selected by the user or otherwise determined appropriate for association with the access information may include any restrictions on when and/or how the access information may be used to access the secured location. Access restrictions may include a valid time of day, valid days of the week, valid dates, limited number of uses, expiration date, user identity, verification procedures, notification procedures, device restrictions, and/or any suitable restriction on when and/or how the secured location may be accessed. In some embodiments, the user of the authorizing device 510 may be provided a list of restrictions and may select none, one, or more of the restrictions to be applied to the encoded image. Additionally and/or alternatively, the authorizing device 510 may determine appropriate restrictions, which may be verified by the user. Further, the steganographic platform 520 and/or the home security system 530 may determine appropriate access restrictions to associate with the encoded image.

At step 551, and according to some embodiments, the authorizing device 510 may send the base image and the one or more access restrictions (if any) to a steganographic platform 520 for encoding.

At step 522, the steganographic platform 520 may determine access information for the secured location and encode that access information and the one or more access restrictions into the base image, thereby generating an encoded image. The access information may be information recognizable by a home security system 530, which may, for example, correspond to the security backend 420 and/or the home security system 430 illustrated in FIG. 4, as identifying a guest who may be permitted to enter the secured location. A guest presenting the access information may be allowed entrance into the location, much like a bearer of a physical key can enter a door protected by a keyed lock. For example, the access information may be a computer-recognizable key value associated with the secured location. As another example, the access information may be a shape or pattern that may be embedded in the base image. The access information may be predetermined and/or may be dynamically determined by the steganographic platform 520, the authorizing device 510, or the home security system 530. The access information may be determined based on attributes associated with the secured location, the home security system, the authorizing device, a user of the authorizing device, the guest device, a user of the guest device, a time of day, a date, a security backend associated with the steganographic platform 520, the home security system 530, and/or any suitable basis for generating and recognizing access information. The access information may be provided to steganographic platform by the home security system 530.

The steganographic platform 520 may provide a steganographic module which may use steganographic techniques to encode the access information and/or access restrictions into one or more portions of the base image, thereby generating the encoded image as discussed above in regard to the security backend 420 of FIG. 4. For example, in some embodiments the base image may be broken into four quadrants. In one illustrative embodiment, the access information may be encoded in the first quadrant, an access restriction relating the permissible access times may be encoded in the second quadrant, an access restriction relating to the number of times the encoded image can be used may be encoded in the third quadrant, and an identifier associated with an intended guest may be encoded in the fourth quadrant. Any appropriate number of portions may be used, and one portion may be encoded to contain more than one access restriction and/or the access information. Additionally and/or alternatively, more than one portion may include a particular access restriction and/or the access information, or a single portion may include the same piece of information encoded multiple times. Such redundant encoding may facilitate better recognition of the encoded image by the home security system 530 or the steganographic platform 520.

The steganographic platform 520 may further store the access information, access restrictions, base image, and/or encoded image in a security database. The information stored in the security database may be used to recognize and validate a later presentation of the encoded image by the guest device 540 at the secured location. For example, the security database may store the base image and use the stored base image as part of extracting the encoded information in the encoded image, as described below in regard to step 524.

In other embodiments, steps 551 and 522 may be omitted, and the authorizing device 510 may determine and encode the access information itself. Alternatively and/or additionally, the authorizing device 510 may receive the access information from the steganographic platform 520 or the home security system 530, and the authorizing device 510 may encode the received access information into the base image.

A wide range of steganographic methods may be used by the steganographic platform 520, or the authorizing device 510, to encode information in the base image. The access information and one or more access restrictions may be encoded in the base image by changing one or more attributes or data values of the base image. For example, in one embodiment a least significant bit of a range of pixel data may be changed to encode the access information. In other embodiments, higher order bits may be used. In still other embodiments, a pattern or other sequence of bits may be used to encode the access information in the base image. Other steganographic methods used to encode the access information and access restrictions in the base image may include adjusting colors, brightness, contrast, patterns, shapes, and/or any other attributes or data of the base image. Additionally and/or alternatively, a key or algorithmic hint may be encoded in the encoded image such that a decoding device may use the key or algorithmic hint to recognize the encoded access information and/or access restrictions. In some embodiments, the steganographically encoded information may be decoded and/or extracted by comparing the encoded image to the base image. In other embodiments, the steganographically encoded information may be decoded and/or extracted based on a pre-determined and/or pre-shared algorithm. A human viewer may not be able to recognize a difference between the base image and the encoded image, but such a difference may be easily recognized by a computer programmed to look for such differences.

At step 553, in some embodiments, the steganographic platform 520 may notify the home security system 530 of one or more of the access restrictions. The home security system 530 may adjust its operation based on the access restrictions. For example, the home security system 530 may activate a security camera or other monitoring device based on a permissible time range associated with the access information. In such an example, the home security system 530 may monitor the secured location for a presentation of the encoded image during the permissible time range, and may turn off the monitoring device or otherwise not watch for the encoded image outside of the time range.

At step 554*a*, in some embodiments, the steganographic platform 520 may send the encoded image to a guest device 540. In another embodiment, the encoded image may be returned to the authorizing device 510 in optional step 552 and the authorizing device 510 may send the encoded image to the guest device 540 at step 554*b*. The encoded image may be sent to the guest device 540 via a number of methods and protocols, such as SMS text messaging, MMS messaging, other mobile messaging services, email, and the like. In one embodiment, the guest device 540 may execute an application associated with the steganographic platform 520 and/or the home security system 530 and may request and/or receive the encoded image through the associated application.

Once the encoded image is received by the guest device 540, a guest may use the guest device 540 to present a display of the encoded image to the home security system 530 in step 555 in order to gain entry to the secured location. The guest device 540 may include or be associated with a display for providing a visual presentation of the encoded image. The user of the guest device 540 may request that the guest device 540 display the encoded image, and the user may orient the guest device 540 such that a monitoring device associated with the home security system 530 is capable of recognizing access information encoded in the displayed image. For example, the user may hold the guest device 540 up to a security camera so that the security camera can see the display. As another example, where the monitoring device is a specialized camera for capturing a display of the encoded image rather than monitoring the premises, a user may place the guest device 540 on a platform or against a panel associated with the monitoring device, or otherwise orient the device such that the monitoring device may capture the encoded image presented on the display.

At step 532, a monitoring device associated with the home security system 530 may capture a display of the encoded image. For example, a security camera may capture a scene including a portion of the premises surrounding the secured location and the guest device 540 presenting the encoded image. Thus, the encoded image may be included in the captured image, though the captured image may contain additional objects and information. In the particular application of these techniques discussed above, for example, the housekeeper may cause their mobile phone to display the encoded image and hold it up to a security camera. The security camera may capture an image including the housekeeper's phone and display, as well as other extra visual information (such as the surroundings, the housekeeper, etc.). In some embodiments, the monitoring device may recognize when a candidate encoded image is presented for capture and capture an image, or the monitoring device may periodically or constantly capture an image and determine whether a candidate encoded image is present. In some embodiments, the monitoring device may capture a series of sequential images and use these to better determine when an encoded image is presented. For example, capturing a sequential series of images of the presented encoded image may allow the home security system 530 or the steganographic platform 520 to better identify the encoded image by adjusting for orientation, glare, or other imperfections in the capture of the presented encoded image. By using the sequential series of images, the home security system 530 or the steganographic platform 520 may be able to reduce errors introduced by tilt, reflections, imperfections in the display of the guest device 540, and the like. The home security system 530 may engage in some preprocessing to determine whether a captured image may contain a candidate encoded image and should be further examined to determine the presence of encoded access information.

In some embodiments, the home security system 530 may transmit captured images upstream to the steganographic platform 520 for further processing, including recognition of encoded information. Thus, at step 556, the home security system 530 may transmit the captured image including the encoded image to the steganographic platform 520. The entire captured image may be transmitted upstream, or a portion of the image may be transmitted in lieu of the entire image. For example, preprocessing done at the home security system 530 may identify a portion of the captured image as containing a candidate encoded image presentation, and may send that portion to the steganographic platform 520. In other embodiments, the home security system 530 may recognize encoded access information without sending the capture upstream. For example, the steganographic platform 520 or the authorizing device 510 may have provided the home security system 530 with an indication of the encoded image or access information, and the home security system 530 may itself watch for and recognize a display of the encoded image.

After receiving the captured image, the steganographic platform 520 may analyze the captured image and recognize the encoded image presented in the captured image in step 524. The steganographic platform 520 may determine which portions of the captured image correspond to a candidate encoded image, and may analyze those portions for the presence of encoded information. In some embodiments where the monitoring device is able to substantially limit the presence of extra information, the steganographic platform 520 may consider the entire captured image as a candidate encoded image. Such a situation may occur where the monitoring device is adapted to receive the display of the encoded image, such as where a scanning panel or other specially configured monitoring device is used to receive the presentation of the encoded image.

The steganographic platform 520 may extract encoded information from the candidate encoded image based on the steganographic techniques used by the steganographic platform 520 or the authorizing device 510 to encode the access information and access restrictions in the encoded image. Information about the steganographic techniques used may be stored in the security database associated with the steganographic platform 520. For example, if the access information was encoded in the least significant bit or higher order bits of a specific portion of the encoded image, the steganographic platform 520 may analyze these portions of the candidate encoded image to extract the encoded access information. Similarly, if the access information were encoded in patterns or shapes in the encoded image, the steganographic platform 520 may analyze the candidate encoded image to determine whether the expected patterns or shapes are present. The steganographic platform 520 may extract the encoded information based on a pre-determined or pre-shared algorithm for encoding the information. Additionally and/or alternatively, a key or algorithmic hint may be encoded in the candidate encoded image and the steganographic platform 520 may extract this key or hint and use it to extract additional encoded information. In other embodiments, the steganographic platform 520 may compare the candidate encoded image to a base image or an encoded image stored in the security database to extract or identify the access information and/or access restrictions.

The extracted or recognized information may be compared to known and/or expected access information as part of step 524. If the extracted information matches the expected access information, the steganographic platform 520 may instruct the home security system 530 to grant the guest access at step 557. For example, step 557 may involve the steganographic platform 520 instructing the home security system 530 to unlock and/or open a door at the secured location. The door may be determined based on a location of the monitoring device that captured the display of the encoded image. For example, if the encoded image is captured by a security camera at a front door, the front door may be unlocked by the home security system 530. This step may further involve recognizing one or more access restrictions encoded in the encoded image or associated with the access information, as may be stored in the security database. The steganographic platform 520 and/or the home security system 530 may determine whether or not the one or more access restrictions are satisfied before the guest is granted access. As discussed above, the one or more access restrictions may, for example, include a time restriction on when access should be granted. If a guest presents the encoded image to the home security system 530 outside of the specified time, the guest may not be granted access. Similarly, the access restrictions may indicate additional verification procedures should be performed prior to granting access, such as capturing sufficient identifying information associated with the guest (e.g., a picture of the guest's face, a complete fingerprint, a retinal scan, a second form of identification, and the like).

When the steganographic platform 520 receives a captured image determined to include a candidate encoded image, or when the steganographic platform 520 detects a display of the encoded image, the steganographic platform 520 may generate an access attempt notification. The access attempt notification may include information regarding the time and nature of the access attempt, and may include the captured image, the encoded image, the extracted information, the access information, and/or any other information identifying the access attempt. The access attempt notification may be stored in the security database. In some embodiments, the access attempt notification may be provided to the authorizing device 510. The access attempt notification may indicate that a guest attempted to access the secured location but was denied access due to the access restrictions associated with the access information.

Once the access information has been extracted, recognized, and/or verified by the steganographic platform 520 and/or the home security system 530, the guest may be granted access to the secure location. In some embodiments, the home security system 530 may acquire identifying information about the guest prior to granting access at step 534. For example, the home security system 530 may deny a guest access until the home security system 530 captures a picture of the guest's face or another appropriate identification of the guest. In some embodiments, the identifying information may be sent to the steganographic platform 520 and/or the authorizing device 510 for verification and/or approval before the guest is granted access. For example, the home security system 530 may capture a picture of the guest's face and send an access request to the authorizing device 510 including the picture. The authorizing device 510 may prompt a user to verify the identity of the guest and approve their access request. If a guest does not submit to identification or if their identity cannot be verified, in some embodiments the guest may be denied access.

In some embodiments, the home security system 530 and/or the steganographic platform 520 may request and/or acquire identifying information from the guest device 540. For example, a device identifier associated with the guest device 540 may be transmitted to the home security system 530 and/or the steganographic platform 520. This device identifier may be used to verify that the device presenting the encoded image is the same device as the device the authorizing user intended to grant access rights to. For example, a guest seeking an encoded image from the authorizing user may provide the authorizing user with an identifier of the guest device 540 and the authorizing device 510 may encode this information in the encoded image or security database.

At step 558, the home security system 530 grants a bearer of the guest device 540 access to the secured location. For example, the home security system 530 may unlock and/or open the door as instructed by the steganographic platform 520 in step 557. The home security system 530 may generate an access log message and send the message to the steganographic platform 520 at step 559a. The access log message may include, for example, the encoded image, the access information, the time of access, the identifying information associated with the guest and/or guest device, and the like. The access log message may be stored in the security database, and the steganographic platform 520 may repackage the access log message and send a notification to the authorizing device 510 at step 559b.

Through the sequence illustrated in FIG. 5, an owner or other authorized user may generate an encoded image and send the image to a guest such that the guest may access a secured location. The guest may present the encoded image to a home security system at the secured location which may recognize access information encoded in the encoded image and grant the guest access to the secured location.

Figure 6:
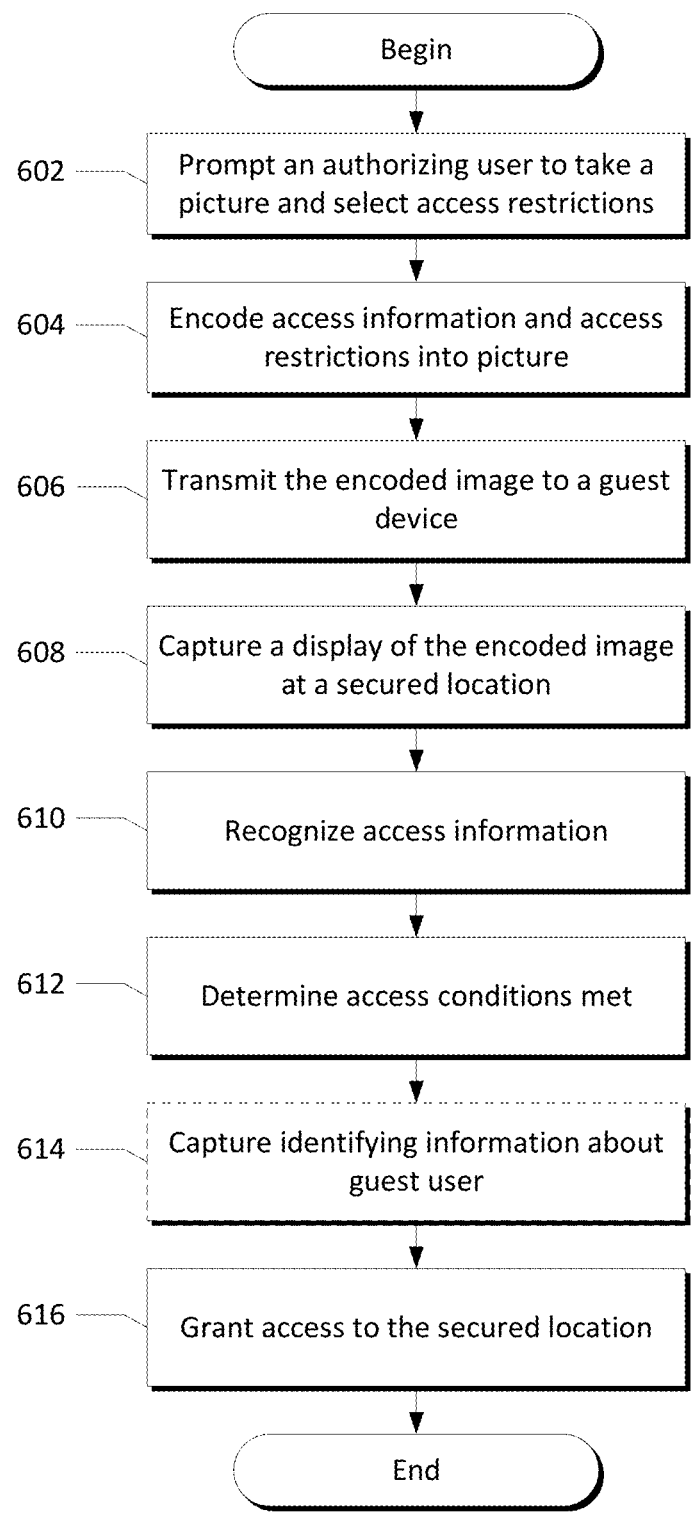
FIG. 6 illustrates an example method for implementing various features described herein.

Having described an example sequence diagram as illustrated in FIG. 5, discussion will now turn to a method according to one or more embodiments as illustrated in FIG. 6.

FIG. 6 illustrates an example method performed in a system such as the system 400 illustrated FIG. 4. An authorizing user of an authorized computing device may request the generation of an encoded image which may be used to provide a guest user of a guest computing device with access to a secured location protected by a security system.

In step 602, the authorizing user may be prompted to take a picture using a camera and/or select an existing image. The picture may be used as a base image to generate the encoded image. The user may also select one or more access restrictions to associate with the encoded image.

In step 604, access information recognizable by the security system may be steganographically encoded into the picture, thereby generating an encoded image. A wide range of steganographic techniques may be used to encode the information as discussed above. The one or more access restrictions may also be encoded into the encoded image. As discussed above, in some embodiments the encoded image may be generated at a security backend or steganographic platform. In other embodiments, the encoded image may be generated by the authorized computing device.

In step 606, the encoded image may be transmitted to the guest device. In some embodiments, a security backend or steganographic platform may transmit the encoded image to the guest device. In other embodiments, the authorized device may transmit the encoded image to the guest device. As discussed above, the encoded image may be transmitted using any suitable protocol for providing the encoded image to the guest computing device, such as SMS messaging, MMS messaging, email, through an application installed on the guest computing device, and the like.

In step 608, a display of the encoded image may be captured. As discussed above, a user of the guest computing device may operate the guest computing device to display the encoded image. The user may orient the guest computing device such that the display of the encoded image may be captured by, for example, a security camera associated with the security system at the secured location.

In step 610, the security system and/or security backend may recognize the access information embedded in the displayed encoded image as captured in step 608. The access information may be extracted from the encoded image based on the steganographic techniques used to encode the access information.

In step 612, the security system and/or security backend may determine whether access conditions are met. For example, the security system and/or security backend may determine whether the access information matches known and/or expected access information for the secured location. Further, the security system and/or security backend may determine whether one or more access restrictions associated with the access information or encoded in the encoded image are satisfied.

In step 614, the home security system may capture identifying information about the guest user. For example, the home security system may capture a picture of the guest user's face, a fingerprint of the guest user, or any other suitable identifying information. In some embodiments, the home security system may capture an identifier associated with the guest device and confirm that the identifier is associated with the access information.

In step 616, the home security system may grant the guest user access to the secure location. For example, the home security system may unlock a door at which the encoded image was presented.

Figure 7:
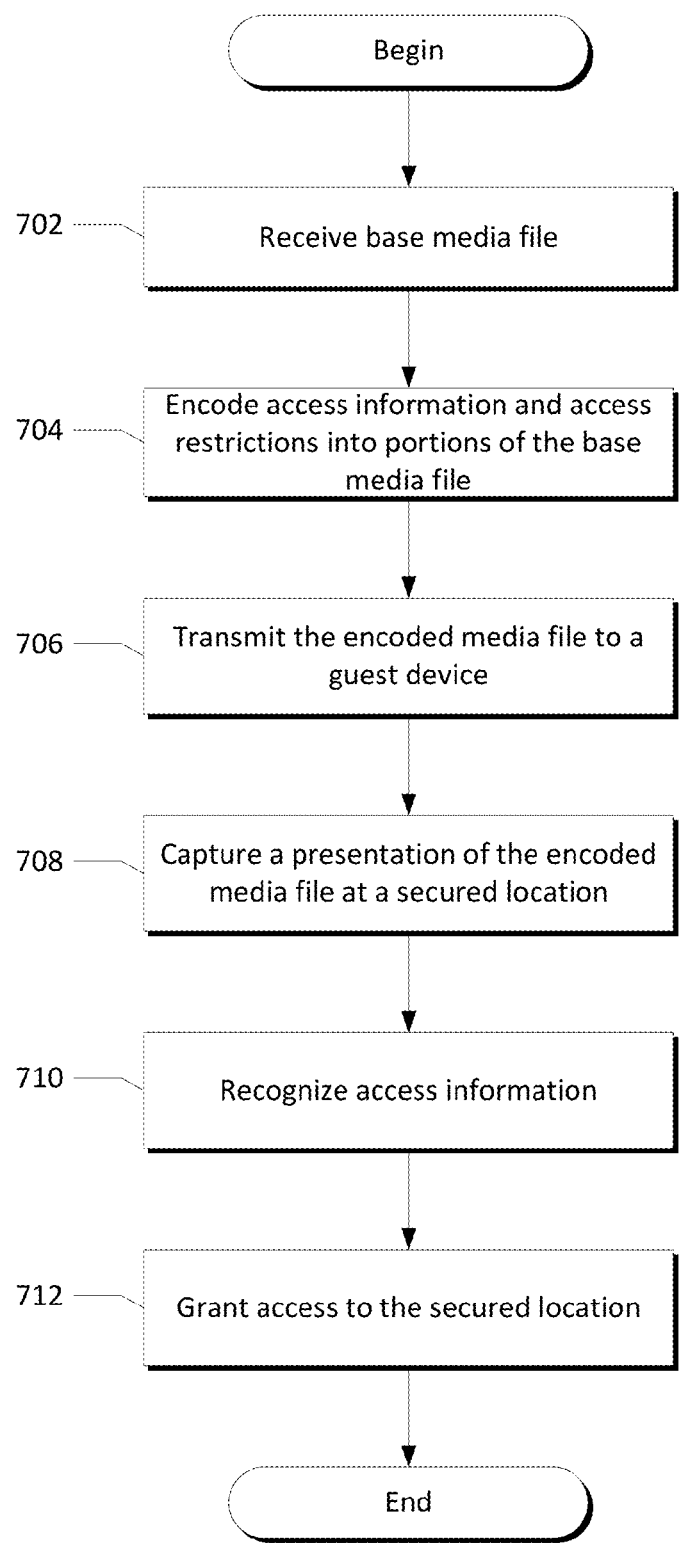
FIG. 7 illustrates another example method for implementing various features described herein.

FIGS. 5 and 6 illustrate techniques applied to images. However, the techniques described herein may be applied to any type of media file such as video, sound, documents, and the like. FIG. 7 illustrates how the techniques described herein may be used with any type of media file.

FIG. 7 illustrates an example method performed in a system such as the system 400 illustrated in FIG. 4. An authorizing user of an authorized computing device may request the generation of an encoded media file which may be used to provide a guest user of a guest computing device with access to a secured location protected by a security system.

In step 702, the authorizing user may provide a base media file that may be received by a device, such as an authorizing device 510 and/or steganographic platform 520 as illustrated in FIG. 5, and used as a base media to generate the encoded media file. The user may also select one or more access restrictions to associate with the encoded media file.

In step 704, access information recognizable by the security system may be steganographically encoded into the base media file, thereby generating an encoded media file. A wide range of steganographic techniques may be used similar to those used to encode the information in the encoded image as discussed above. For example, where the base media file is a sound file, the steganographic techniques may involve encoding the access information in the sound file by modifying the tones or volume of the sound. Such a modification may be difficult for a human to recognize but may be easily recognized by a computing device programmed to identify the difference. Similarly, a video file may be modified such that a color or brightness in a frame or section is changed, and the data may be encoded as part of a series of images making up the video. The encoded data may, in some embodiments, be encoded across the series of frames and could be extracted from a presentation of the video. Additionally, one or more access restrictions may also be encoded into the encoded media file. In some embodiments the encoded media file may be generated at a security backend or steganographic platform, similar to the encoded image discussed above. In other embodiments, the encoded media file may be generated by the authorized computing device.

In step 706, the encoded media file may be transmitted to the guest device. In some embodiments, a security backend or steganographic platform may transmit the encoded media file to the guest device. In other embodiments, the authorized device may transmit the encoded media file to the guest device. As discussed above, the encoded media file may be transmitted using any suitable protocol for providing the encoded media file to the guest computing device, such as SMS text messaging, MMS messaging, email, through an application installed on the guest computing device, and the like.

In step 708, a presentation of the encoded media file may be captured. Similar to the display of the encoded image above, a user of the guest computing device may operate the guest computing device to present the encoded media file. The user may orient the guest computing device such that the presentation of the encoded media file may be captured by a monitoring device associated with the security system at the secured location. For example, the monitoring device may be a microphone configured to capture a presentation of an encoded sound file. As another example, the monitoring device may be a video camera configured to capture a presentation of an encoded video file.

In step 710, a security system and/or security backend associated with the monitoring device may recognize the encoded access information and/or access restrictions in the encoded media file. Similar to the encoded image discussed above, the security system and/or security backend may extract the encoded information based on the steganographic encoding techniques used in step 704.

In step 712, the security system may grant the guest user access to the secured location based on recognizing the access information encoded in the encoded media file in step 710.

As a result of the processes illustrated in FIGS. 6 and 7, a guest user may be provided with access to a secured location based on an encoded image or media file generated by an authorized user. The method illustrated, for example, in FIGS. 6 and 7 may provide increased flexibility and ease in providing guests access to a secured location such as a residence or business.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:
1. A method comprising:
receiving, by a computing device, an access request associated with a guest mobile device;
receiving, from an authorized mobile device, a base image;
encoding one or more portions of the base image with access information to generate an encoded image, wherein the access information is steganographically encoded in the encoded image;
transmitting the encoded image for receipt by the guest mobile device;
receiving, from a camera, a captured image, wherein the captured image is a display by the guest mobile device of the encoded image; and
granting, based on verification of the access information in the captured image, access to a secured location.

2. The method of claim 1, further comprising:
receiving, from the authorized mobile device, one or more access restrictions for a user associated with the guest mobile device; and
encoding one or more portions of the encoded image with the access restrictions, wherein the one or more access restrictions are steganographically encoded in the encoded image, wherein the granting access to the secured location is further based on verification of the one or more access restrictions in the captured image.

3. The method of claim 1, further comprising:
receiving an identifier of the guest mobile device, wherein the granting access to the secured location is further based on the identifier.

4. The method of claim 1, wherein:
the base image is an image captured by a camera of the authorized mobile device.

5. The method of claim 1, further comprising:
causing the authorized mobile device to prompt a user to approve access to the secured location, wherein the granting the access to the secured location is responsive to receiving an indication of user approval of the access to the secured location.

6. The method of claim 1, wherein the receiving the captured image, the encoding, and the granting are performed by a system located remotely from the secured location.

7. A system comprising:
a computing device configured to:
  receive an access request associated with a guest mobile device;
  receive a base image from an authorized mobile device;
  encode at least a first portion of the base image with access information to generate an encoded image, wherein the access information is steganographically encoded in the encoded image; and
  cause the encoded image to be transmitted to the guest mobile device; and
a premises system comprising a monitoring device at a secured location, the premises system configured to:
  obtain, via the monitoring device, a captured image, wherein the captured image is a display by the guest mobile device of the encoded image; and
  grant, based on verification of the access information in the captured image, access to the secured location.

8. The system of claim 7, wherein the premises system is configured to verify the access information in the display of the encoded image by:
transmitting at least a portion of the encoded image to the computing device; and
receiving an indication from the computing device that the encoded image comprises the access information.

9. A method comprising:
requesting, by a guest mobile device, an encoded image;
receiving, by the guest mobile device and from an authorized mobile device, the encoded image, wherein access information, associated with an access request for a secured location, is steganographically encoded in the encoded image;
displaying, by the guest mobile device, the encoded image to a monitoring device of the secured location; and
obtaining, in response to the displaying, access to the secured location.

10. The method of claim 9,
wherein one or more access restrictions are steganographically encoded in the encoded image, and wherein the obtaining access to the secured location is further based on the one or more access restrictions.

11. The method of claim 1, wherein the camera is located at the secured location.

12. The method of claim 1, wherein the granting comprises transmitting a message to another computing device associated with the secured location.

13. The method of claim 1, wherein the granting comprises causing a locking mechanism at the secured location to unlock.

14. The method of claim 1, further comprising determining one or more access restrictions associated with the access information in the captured image, wherein the granting access to the secured location is further based on the one or more access restrictions.

15. The method of claim 14, wherein the one or more access restrictions comprise one or more of: time of day restrictions, weekday restrictions, number of uses permitted, or authentication levels.

16. The method of claim 14, wherein the one or more access restrictions indicate one or more additional verification procedures.

17. The method of claim 16, wherein the one or more additional verification procedures comprise one or more of the following: verifying an image of a guest user face, verifying a fingerprint, performing a retinal scan, or receiving a supplemental form of identification.

18. The method of claim 1, wherein the base image is an image associated with the secured location.

19. The system of claim 7, wherein the base image is an image captured by a camera of the authorized mobile device.

20. The system of claim 7, wherein the premises system comprises a camera, and wherein the premises system is configured to obtain the captured image by capturing the captured image via the camera.

21. The system of claim 7, wherein the premises system is configured to grant access to the secured location by transmitting an instruction to unlock a locking mechanism.

* * * * *